US009794109B2

(12) United States Patent
McKinney et al.

(10) Patent No.: US 9,794,109 B2
(45) Date of Patent: Oct. 17, 2017

(54) METHOD OF MAINTAINING NETWORK ADDRESS TRANSLATION MAPPING AND CLIENT DEVICE EMPLOYING SAME

(71) Applicant: Alcatel-Lucent USA, Inc., Murray Hill, NJ (US)

(72) Inventors: Gordon E. McKinney, Cedar Park, TX (US); Frank Quatro, Austin, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 259 days.

(21) Appl. No.: 13/773,730

(22) Filed: Feb. 22, 2013

(65) Prior Publication Data
US 2014/0068044 A1 Mar. 6, 2014

Related U.S. Application Data

(60) Provisional application No. 61/662,156, filed on Jun. 20, 2012.

(51) Int. Cl.
| H04L 12/24 | (2006.01) |
| H04L 29/08 | (2006.01) |
| G06F 21/44 | (2013.01) |
| H04L 29/12 | (2006.01) |

(52) U.S. Cl.
CPC .............. *H04L 41/00* (2013.01); *G06F 21/44* (2013.01); *H04L 41/0816* (2013.01); *H04L 61/2553* (2013.01); *H04L 67/14* (2013.01); *H04L 61/2514* (2013.01)

(58) Field of Classification Search
None
See application file for complete search history.

(56) References Cited

U.S. PATENT DOCUMENTS

| 7,373,500 B2* | 5/2008 | Ramelson ............ H04L 63/0428 713/150 |
| 8,065,419 B2* | 11/2011 | Vimpari ............ H04L 29/12471 709/227 |
| 8,228,861 B1* | 7/2012 | Nix ...................... H04W 36/00 370/329 |
| 2005/0188098 A1* | 8/2005 | Dunk ..................... H04L 67/14 709/232 |
| 2007/0055766 A1* | 3/2007 | Petropoulakis ..... G06F 11/3006 709/224 |
| 2009/0147772 A1* | 6/2009 | Rao ..................... H04L 12/1818 370/352 |
| 2009/0175197 A1* | 7/2009 | Nechushtan ...... H04L 29/12339 370/254 |

(Continued)

OTHER PUBLICATIONS

Ji, Ming, "XEP-0304: Whitespace Keepalive Negotiation", XMPP Standards Foundation, Aug. 18, 2011, Version 0.1, 8 pps.

*Primary Examiner* — Ranodhi Serrao
*Assistant Examiner* — James Fiorillo
(74) *Attorney, Agent, or Firm* — Parker Justiss, PC

(57) ABSTRACT

A client device and method for maintaining NAT mapping. In one embodiment the client device includes: (1) a network interface circuit operable to transmit a keepalive message on an interval to a NAT gateway and (2) an interval adjust circuit configured to: (2a) increment the interval upon an acknowledgment of the keepalive message and (2b) decrement the interval upon a failure to receive the acknowledgment.

16 Claims, 2 Drawing Sheets

(56) References Cited

U.S. PATENT DOCUMENTS

| | | | |
|---|---|---|---|
| 2010/0100915 A1* | 4/2010 | Krikorian | H04N 21/4398 725/109 |
| 2010/0157926 A1* | 6/2010 | Eronen | H04L 29/12471 370/329 |
| 2010/0217837 A1* | 8/2010 | Ansari | G06Q 30/04 709/218 |
| 2010/0278101 A1* | 11/2010 | Bengtsson | H04L 29/12471 370/328 |
| 2010/0281169 A1* | 11/2010 | Charles | H04L 69/162 709/227 |
| 2010/0312899 A1* | 12/2010 | Herzog | H04L 67/141 709/228 |
| 2011/0106968 A1* | 5/2011 | Froehlich | H04J 3/0667 709/232 |
| 2011/0138458 A1* | 6/2011 | Kumar | H04L 63/18 726/15 |
| 2012/0020293 A1* | 1/2012 | Nix, Jr. | H04L 41/0856 370/328 |
| 2014/0330976 A1* | 11/2014 | van Bemmel | H04L 67/1023 709/226 |

\* cited by examiner

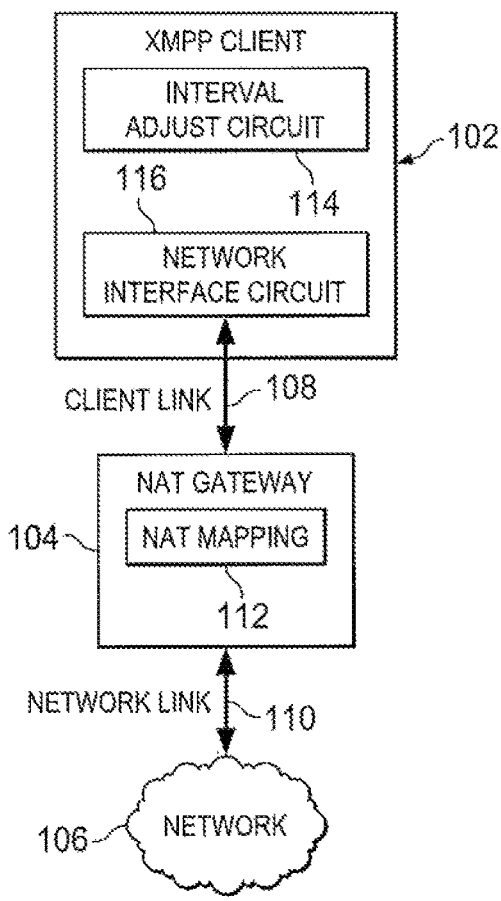
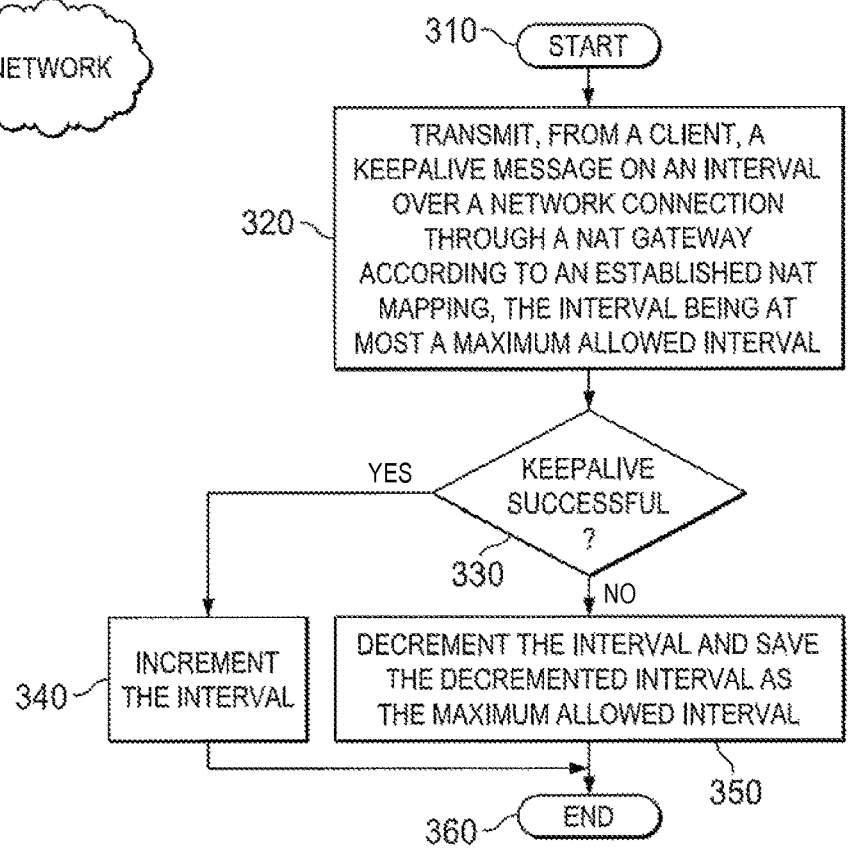

METHOD OF MAINTAINING NETWORK ADDRESS TRANSLATION MAPPING AND CLIENT DEVICE EMPLOYING SAME

CROSS-REFERENCE TO RELATED APPLICATION

This application claims priority based on U.S. Provisional Application Ser. No. 61/662,156, filed by McKinney, et al., on Jun. 20, 2012, entitled "Communication with Managed Devices," commonly assigned with this application and incorporated herein by reference.

TECHNICAL FIELD

This application is directed, in general, to network address translation (NAT) networks and, more specifically, to extensible messaging and presence protocol (XMPP) keepalive messaging.

BACKGROUND

Many networks employ NAT boundaries in their network architecture. A NAT gateway establishes the NAT boundary to mask client devices connected to the NAT gateway from the public network. The NAT gateway creates a NAT mapping of all client devices actively communicating through the NAT gateway and routes packets of data accordingly. Consequently, a private network is created that connects to the public network through the NAT gateway, the one device with sufficient information to route data to each client device on the private network.

It is often the case that a client device residing on a network behind a NAT gateway needs to communicate with a server beyond the NAT gateway. The client and server negotiate a transmission control protocol (TCP) connection through the NAT gateway. The gateway maps the network address or Internet protocol (IP) address of the client and then manipulates outgoing packets, masquerading as the source. Upon receipt of the packets, the server on the other end of the TCP connection responds with its own packets, setting the gateway as the destination. The gateway recognizes the response packets as destined for the client, manipulates them and then routes them to the client according to the NAT mapping. This is the basic process by which a client and server communicate through a NAT gateway for as long as is necessary.

A general principal of TCP connections through a NAT gateway is that they eventually close. Whatever the purpose of the connection, at some point, either the client or server will stop sending packets, or the client and server will negotiate a termination of the connection. A corollary principal of NAT gateway design is the NAT mapping maintained by the NAT gateway expire as a matter of resource conservation. As long as communication is active over the TCP connection, the NAT mapping is maintained, and no expiration is necessary. When communication slows or halts altogether, the NAT mapping times out and needs to be reestablished if further communication is to be undertaken.

SUMMARY

One aspect provides an XMPP client device, including: (1) a network interface circuit operable to transmit a keepalive message on an interval to a NAT gateway, and (2) an interval adjust circuit configured to: (2a) increment the interval upon an acknowledgment of the keepalive message, and (2b) decrement the interval upon a failure to receive the acknowledgment (which may be inferred from closure of the TCP connection).

Another aspect provides a method of maintaining a NAT mapping, including: (1) incrementing an interval, (2) transmitting, from a client, a keepalive message on said interval over a network connection to a NAT gateway according to an established NAT mapping, the interval being at most a maximum allowed interval and (3) decrementing the interval if the transmitting is not acknowledged through the NAT gateway (which may be inferred from closure of the TCP connection), and employing the decremented interval as the maximum allowed interval.

Yet another aspect provides a NAT enabled network, including: (1) a gateway having a NAT mapping and couplable to the NAT enabled network and (2) a client couplable to the NAT enabled network and operable to communicate through the gateway with a server over a TCP connection, the client being an element of the NAT mapping and having: (2a) a network interface circuit operable to transmit a keepalive message on an interval to the gateway, the interval being at most a maximum allowed interval and (2b) an interval adjust circuit configured to: (2b1) increment the interval and (2b2) decrement the interval and employ the decremented interval as the maximum allowed interval upon a failure to receive an acknowledgment of the keepalive message (which may be inferred from closure of the TCP connection).

BRIEF DESCRIPTION

Reference is now made to the following descriptions taken in conjunction with the accompanying drawings, in which:

FIG. 1 is a block diagram of one embodiment of an XMPP client coupled to a NAT network;

FIG. 3 is a flow diagram of one embodiment of a method of maintaining a NAT mapping.

DETAILED DESCRIPTION

Figure 2:
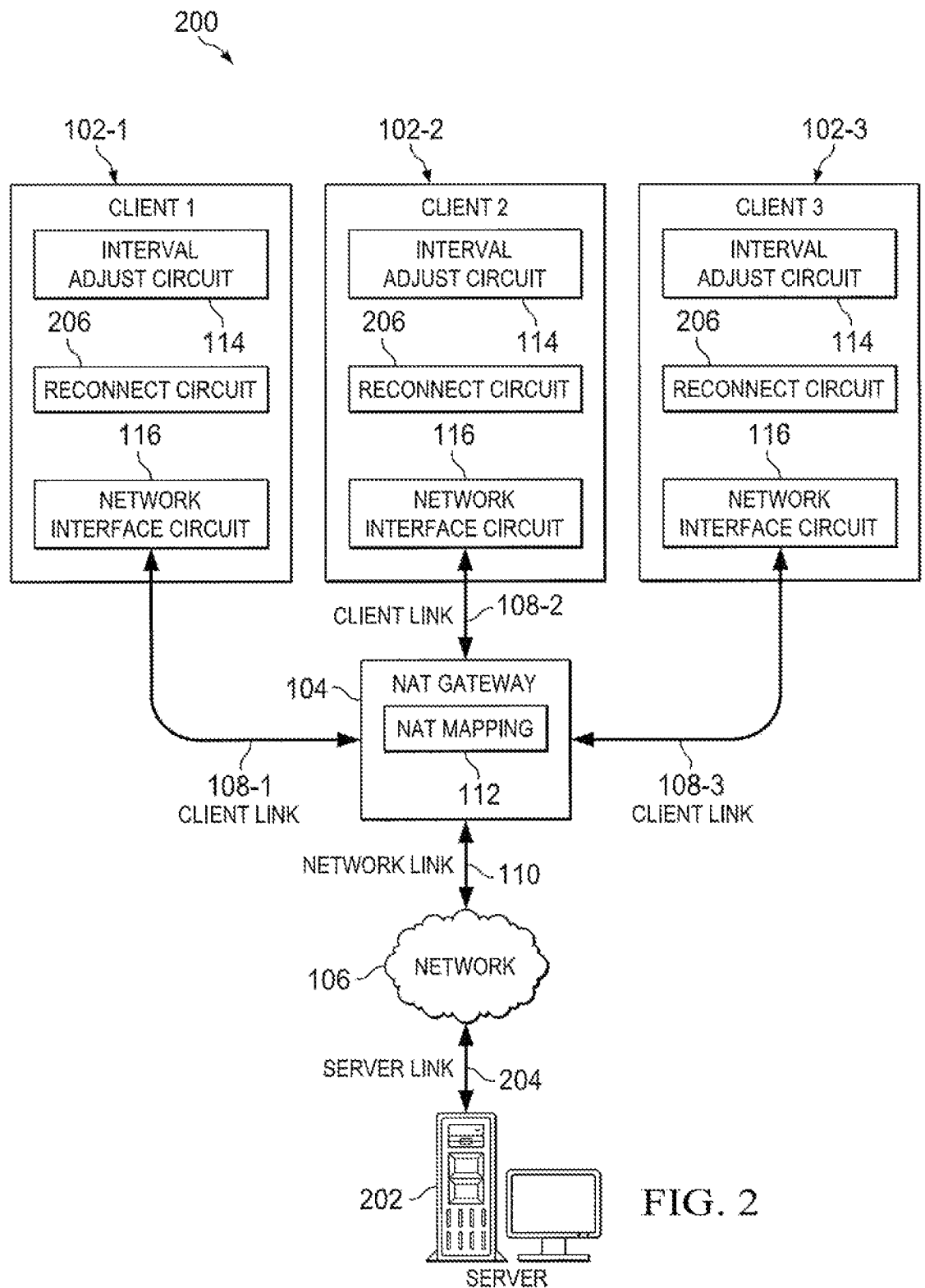
FIG. 2 is a block diagram of one embodiment of a NAT network having several clients coupled.

Many TCP connections are intended for long duration periodic messaging. Often the period between messages is longer than the timeout duration for the NAT gateway, meaning the NAT mapping expires between messages. This results in a "half-closed" TCP connection where client packets may continue to flow to the gateway, but they are not forwarded to their destination. Likewise, incoming packets are not routed to the client.

Networks subject to these "orphaned" connections often employ XMPP, having an XMPP client and an XMPP server communicating through the NAT gateway. The XMPP client may employ a "keepalive" message sent through the gateway to prevent the NAT mapping from timing out. The frequency of these messages is fixed for the client or server device or, in some cases, is negotiated by the client and server and remains constant throughout operation (i.e., duration of the connection).

Before describing various embodiments of the client device or method of maintaining a NAT mapping, NAT gateways and XMPP will be generally described.

Communication systems employing NAT gateways are often collections of many devices chosen for a variety of reasons and from many different manufacturers. Consequently, two NAT gateway devices may timeout their respective NAT mappings on different intervals. A robust communication system would necessarily have client devices transmit keepalive messages on an interval just less than the lowest timeout interval of the NAT gateways which provide a route between the client and server.

XMPP was created as a protocol for extensible markup language (XML) streaming, messaging, presence, and contact lists. One feature of XMPP is the handling of silent peers, particularly the use of a whitespace keepalive message sent through the NAT gateway to maintain NAT mapping. The whitespace keepalive message is a "whitespace," e.g., a single character "whitespace," transmitted over the connection. The message is sent along just as any other and is essentially ignored by the destination server. The NAT gateway treats the message as an indicator of an active connection and will not reset the timeout clock for the NAT mapping.

It is realized herein that while increasing the keepalive messaging frequency of a single client seems harmless, when implemented on the scale of a modern network of mobile devices or large private network, the increased traffic creates a significant strain on the network infrastructure, including server firewalls, server central processing units (CPUs) and bandwidth. A collection of many thousands of devices acting as XMPP clients can present a significant drag on network bandwidth when each is sending keepalive messages every one minute, five minutes, ten minutes or longer.

It is fundamentally realized herein that were a lower keepalive message frequency to be determined during operation, while the connection is live, and employing the lower keepalive frequency would improve network utilization as a whole. It is realized herein that a relatively brief messaging interval can be a starting point for a gradual increase in that interval until a maximum allowed interval is established that still prohibits the NAT mapping timeout. It is realized herein that the keepalive messaging interval can be incremented, or "stepped up," as long as the keepalive messages are successfully maintaining the NAT mapping.

It is further realized herein that this process could ultimately force an orphaned connection when the interval is incremented beyond the timeout threshold. At that point, the keepalive message would receive no reply, effectively identifying the orphaned connection. It is realized herein that the connection can be reestablished and the keepalive messaging interval can be decremented, or "stepped down," by a step back to the last known successful keepalive messaging interval.

It is realized herein that certain messages received by the client may cause a timeout on the client end. These messages are often command solicitations sent by the server that start a timeout period that is typically briefer than the keepalive messaging interval. If the timeout period expires, the client closes its connection, resulting in a half-closed connection. It is realized herein these client induced half-closed connections can be avoided by using a constant reduced keepalive message interval for a period of time, or "active window," that begins upon receipt of the command solicitation or other events that may cause the client to timeout. The active window extends at least the duration of the timeout period associated with the solicitation or event, and may be extended by a buffer time. It is realized herein that the constant reduced keepalive message interval should be small enough to be suitable for detecting and recovering from a half-closed connection. It is further realized herein the constant reduced interval may be as small as five seconds; however, for certain systems, a one, ten or sixty second interval may be suitable. It is realized herein that when the active window ends, the adjustment scheme introduced above can be resumed by assuming the last interval arrived upon or by returning to the original messaging interval and repeating the incrementing process.

However, it is realized that the application layer has no way of directly detecting a half-closed state. Instead, the connection should be probed through a keepalive packet (e.g., an XMPP whitespace keepalive packet, not a TCP keepalive packet). The process of probing the connection can take seconds or minutes due to TCP retry semantics (IETF RFC 793 sec 3.7).

Introduced herein are various embodiments of a client device and a method of maintaining NAT mapping. Certain embodiments of the method consider one or more of the following events:

1. TCP layer returns failure on send of XMPP Keepalive.
2. TCP layer returns success on send of XMPP Keepalive and the connection is complete and available.
3. TCP layer returns success on send of XMPP Keepalive and later a re-transmission timeout is reached and notification of a closed connection occurs.
4. Notification of a closed connection for some reason other than an XMPP Keepalive attempt. e.g. legitimately closed connections.

Having generally described NAT gateways and XMPP, various embodiments of the client device and method of maintain a NAT mapping will be described.

FIG. 1 is a block diagram of a network 100 employing a NAT gateway 104 and one embodiment of an XMPP client 102 operable to adjust a keepalive messaging interval. The XMPP client 102 includes an interval adjust circuit 114 and a network interface circuit 116. In one embodiments, the network interface circuit 116 includes a network interface controller or NIC. Certain embodiments may employ a wireless NIC, others may employ a wired NIC. Certain embodiments may employ a network interface circuit 116 operable to connect to a cellular network.

Continuing the embodiment of FIG. 1, the XMPP client 102 is coupled to a NAT gateway 104 via a client link 108. The NAT gateway 104 is further coupled to a network 106 via a network link 110. In the illustrated embodiment, a coupling of the XMPP client 102 and the network 106 is effected by a NAT mapping 112 and respective links 108 and 110.

The XMPP client 102 communicates with the network 106 by establishing the NAT mapping 112 within the NAT gateway 104 and establishing a TCP connection between the XMPP client 102 and some other server on the network 106. During operation, the XMPP client 102 is not reachable by the other device other than through the NAT gateway 104. Outgoing packets from the XMPP client 102 are manipulated by the NAT gateway 104 before being routed along to the other device on the network 106. The manipulations by the NAT gateway 104 effectively allow it to masquerade as the origin of the packets. The other device then responds to the packets by sending its own packets to the NAT gateway 104. The NAT gateway 104 receives the packets and recognizes the XMPP client 102 is the actual destination. The NAT gateway 104 manipulates the incoming packets and routes them according to the NAT mapping 112 to the XMPP client 102.

When communication between the XMPP client 102 and the server 202 on the network 106 slows, periodic XMPP whitespace keepalive messages are sent from the XMP client 102 via the network interface circuit 116. The keepalive messages are sent at the previously determined successful interval and the server 202 acknowledges receipt of the message. Upon receipt of the acknowledgment, the interval adjust circuit 114 increments the keepalive message interval by some length of time (e.g., one minute). As long as the other device continues to respond to acknowledge the keepalive message, the interval adjust circuit 114 continues to increment the interval. Upon a failure to acknowledge the keepalive message or the closure of the TCP connection, the interval adjust circuit 114 decrements the interval and also sets that interval as a new maximum allowable interval for keepalive messages. The XMPP client 102 reestablishes the NAT mapping 112 with the NAT gateway 104 to reestablish the TCP connection with the other device on the network 106. The new maximum allowable interval is then used as the keepalive messaging interval for the duration of the connection.

FIG. 2 is a block diagram of one embodiment of a NAT enabled network 200 having a NAT gateway 104 with three clients "behind" it: client 1 102-1, client 2 102-2, client 3 102-3. Alternate embodiments of the network 200 may include any number of clients. Mobile networks may have several thousand client devices behind a single gateway. Other embodiments may be simple private networks of a business or residence, having one or two client devices.

In the embodiment of FIG. 2, the NAT gateway 104 has a NAT mapping 112 of each client 102-1, 102-2, 102-3 and their respective client links 108-1, 108-2, 108-3. The NAT gateway 104 is linked to a network 106 by a network link 110. A server 202 is also coupled to the network 106 by a server link 204. In other embodiments, several server devices or possibly other NAT gateways masking yet another private network may exist.

Continuing the embodiment of FIG. 2, each of the clients 102-1, 102-2, 102-3 includes an interval adjust circuit 114, a network interface circuit 116 and a reconnect circuit 206. Each client 102-1, 102-2, 102-3 is operable as XMPP client 102 of FIG. 1. The clients 102-1, 102-2, 102-3 are further operable to employ the reconnect circuit 206 when a keepalive message goes unacknowledged (which may be inferred from a notification of TCP connection closure), indicating a timeout of the NAT mapping 112. The reconnect circuit 206 reestablishes the NAT mapping 112 with respect to its respective client 102-1, 102-2, 102-3.

Each client 102-1, 102-2, 102-3 is further operable to connect to the server 202 through the NAT gateway 104 and over the network 106. Once the NAT mapping 112 is established and a TCP connection made to the server 202, packets of data are routed to and from the NAT gateway 104 according to the NAT mapping 112. The server 202 may be connected to several clients concurrently, allowing multiple sessions to occur concurrently. The several clients may be one or more of the clients 102-1, 102-2, 102-3, or possibly clients from other private networks behind other NAT gateways. The server 202 sends all packets destined for the clients 102-1, 102-2, 102-3 to NAT gateway 104. NAT gateway 104 determines the appropriate final destination of those packets according to the NAT mapping 112 and routes the packets.

Similar to the XMPP client 102 of FIG. 1, the clients 102-1, 102-2, 102-3 transmit keepalive messages through the NAT gateway 104 to the server 202. The server 202 responds to each keepalive message as it is received, and each interval adjust circuit 114 incrementally increases the interval between messages from its respective client. When a client fails to receive an acknowledgment from the server 202 or the client receives notification of closure of the TCP connection, its respective interval adjust circuit 114 decrements the interval and employs the reconnect circuit 206 to reestablish the XMPP connection and NAT mapping 112.

FIG. 3 is a flow diagram of one embodiment of a method of maintaining a NAT mapping in a NAT gateway. The method begins in a start step 310. In a step 320, an interval is incremented. In a step 330, a keepalive message is transmitted by a client to the NAT gateway towards the server. In certain embodiments, the destination device is a server sitting on a public network or another NAT gateway masking another private network.

In the method of FIG. 3, the keepalive message is transmitted periodically, the interval between messages being no greater than a maximum allowed interval. In certain embodiments the maximum allowed interval is thirty minutes. In other embodiments, the maximum may be, for example, 100 minutes or more. In the embodiment of FIG. 3, when the keepalive message reaches the NAT gateway, the NAT gateway routes the message out to a public network on which the destination device sits. The keepalive message operates to reset the timeout clock on the NAT mapping in the NAT gateway.

Upon receipt of the keepalive message, the destination device acknowledges the message by returning a TCP acknowledgement destined for the NAT gateway. The NAT gateway recognizes the acknowledgement and routes the acknowledgement according to the NAT mapping. A determination is made by the client in a decisional step 330 as to whether the keepalive message was successful. If the acknowledgement is received, the keepalive message was successful, otherwise TCP retransmission semantics on the client will timeout indicating failure of the keepalive transmission. Upon a successful keepalive message, the method ends in an end step 360. In certain embodiments, the step size of the increment is five minutes, while in other embodiments the step size may be two minutes or one minute, and in yet other embodiments the step size may be ten or twenty minutes. The selection of the step size is ultimately a balance of unnecessarily small increments and a low quality optimization. Each of the alternate embodiments should converge on a maximum interval eventually.

Continuing the method of FIG. 3, if the keepalive message has failed (which may be inferred from closure of the TCP connection), the interval between keepalive messages is decremented to the last successful interval in a step 350. The new interval becomes the maximum interval and is used for the duration of the connection. The failed keepalive message means the NAT mapping has timed out and must be reestablished. The client initiates a reconnect and resumes the periodic keepalive messages. The method then ends in the end step 360.

In alternate embodiments, the initial interval between keepalive messages is reduced by a buffer time. The buffer time ensures keepalive message is transmitted sufficiently before the NAT mapping timeout to allow for receipt of a response acknowledgement. In certain embodiments, the buffer time may be as little as a few seconds or several tens of seconds. The buffer size operates in conjunction with the step size, and in certain embodiments grows proportionally.

Those skilled in the art to which this application relates will appreciate that other and further additions, deletions, substitutions and modifications may be made to the described embodiments.

What is claimed is:

1. A method of maintaining a network address translation (NAT) mapping comprising:

incrementing, by an extensible and presence protocol (XMPP) client device, an interval for transmitting to a NAT gateway;

transmitting, from the XMPP client device, a singular type keepalive message on said interval over a network connection to said NAT gateway according to an established NAT mapping, said interval being at most a maximum allowed interval; and upon an acknowledgement through said NAT gateway, of said singular keepalive message, further incrementing, by said XMPP device, said interval when said interval is less than said maximum allowed interval; and if said transmitting is not acknowledged through said NAT gateway indicating a failure of said established NAT mapping:

decrementing, by the XMPP client device said interval to a last successful interval of when said acknowledgement was received;

employing the decremented interval as said maximum allowed interval: and establishing a new NAT mapping and a new XMPP connection only upon said failure.

2. The method recited in claim 1 wherein said keepalive message is an extensible messaging and presence protocol (XMPP) whitespace keepalive message.

3. The method recited in claim 1 wherein said network connection is reduced by a time buffer.

4. The method recited in claim 1 wherein said network connection is a transmission control protocol (TCP) connection.

5. The method recited in claim 1 wherein said transmitting is carried out on a reduced interval for a period of time and said method further comprising:

initializing said period of time on receipt of a command solicitation through said NAT gateway;

transmitting said keepalive message on said reduced interval; and expiring said period of time and resuming said transmitting on said interval.

6. The method recited in claim 1 wherein said client is a mobile device.

7. An extensible message and presence protocol (XMPP) client device, comprising:

a network interface circuit of the client device which transmits a singular type keepalive message on an interval to a network address translation (NAT) gateway;

an interval adjust circuit of the client device which:

increments said interval upon an acknowledgment of said singular type keepalive message, and decrements said interval to a last successful interval of when said acknowledgement was received, upon a failure to receive said acknowledgment of said single type keepalive message, said failure indicating a NAT mapping timeout;

wherein said interval is at most a maximum allowed interval, and said interval adjust circuit is further configured to employ the decremented interval as said maximum allowed interval upon said failure; and a reconnect circuit of the client configured to initiate a NAT remapping and establish a new XMPP connection upon said failure.

8. The XMPP client device recited in claim 7 wherein said keepalive message is an XMPP whitespace keepalive message.

9. The XMPP client device recited in claim 7 wherein said acknowledgement is by receipt of a response acknowledgement through said NAT gateway.

10. The XMPP client device recited in claim 7, wherein said XMPP client is further configured to reduce said interval by a buffer time.

11. The XMPP client device recited in claim 7 wherein said network interface circuit includes a network interface controller (NIC).

12. A network address translation (NAT) enabled network, comprising:

a gateway having a NAT mapping and couplable to said NAT enabled network; and a client couplable to said NAT enabled network and operable to communicate through said gateway with a server over a transmission protocol (TCP) connection, said client being an element of said NAT mapping and having:

a network interface circuit of the client which transmits a singular type extensible messaging and presence protocol (XMPP) whitespace keepalive message on an interval to said gateway, said interval being at most a maximum allowed interval, an interval adjust circuit of the client which:

increments said interval upon an acknowledgement through said NAT gateway, of said singular keepalive message and decrements said interval to a last successful interval of when said acknowledgement was received and employs the decremented interval as said maximum allowed interval upon a failure to receive said acknowledgment of said singular keepalive message, wherein said failure indicates said TCP connection is incomplete and said NAT mapping has expired, and a reconnect circuit of the client configured to initiate a NAT remapping and to establish said TCP connection only upon said failure.

13. The NAT enabled network recited in claim 12 wherein said interval adjust circuit is further configured to:

employ a reduced interval for a period of time beginning on receipt of a command solicitation from said server;

resume employment of said interval upon expiration of said period of time, said period of time having a duration based on a timeout property associated with said command solicitation.

14. The NAT enabled network recited in claim 12 wherein said acknowledgement is by receipt of a response acknowledgement through said NAT gateway.

15. The NAT enabled network recited in claim 12 wherein said interval adjust circuit is configured to reduce said interval by a buffer time.

16. The NAT enabled network recited in claim 12 wherein said network interface circuit includes network interface controller (NIC).

\* \* \* \* \*